(12) United States Patent
Kim et al.

(10) Patent No.: US 10,403,914 B2
(45) Date of Patent: Sep. 3, 2019

(54) INTEGRATED FUEL CELL CONTROL SYSTEM AND OPERATING METHOD THEREOF

(71) Applicant: Hyundai Motor Company, Seoul (KR)

(72) Inventors: Ji Tae Kim, Gyeonggi-do (KR); Kyu Il Lee, Gyeonggi-do (KR); Keun Bong Ham, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 215 days.

(21) Appl. No.: 15/282,107

(22) Filed: Sep. 30, 2016

(65) Prior Publication Data

US 2017/0237090 A1 Aug. 17, 2017

(30) Foreign Application Priority Data

Feb. 12, 2016 (KR) ........................ 10-2016-0016261

(51) Int. Cl.
*H01M 8/00* (2016.01)
*H01M 8/04223* (2016.01)
*H01M 8/04029* (2016.01)
*H01M 8/0438* (2016.01)
*H01M 8/0444* (2016.01)
*H01M 8/04746* (2016.01)
*H01M 8/04537* (2016.01)
*H01M 8/04302* (2016.01)

(52) U.S. Cl.
CPC ... *H01M 8/04231* (2013.01); *H01M 8/04029* (2013.01); *H01M 8/0438* (2013.01); *H01M 8/04302* (2016.02); *H01M 8/04388* (2013.01); *H01M 8/04417* (2013.01); *H01M 8/04447* (2013.01); *H01M 8/04485* (2013.01); *H01M 8/04589* (2013.01); *H01M 8/04753* (2013.01); *Y02P 70/56* (2015.11)

(58) Field of Classification Search
CPC ......... H01M 8/04029; H01M 8/04231; H01M 8/0438; H01M 8/04485; H01M 8/04753; H01M 8/04302; H01M 8/04417; H01M 8/04447; H01M 8/04589; Y02P 70/56
See application file for complete search history.

(56) References Cited

U.S. PATENT DOCUMENTS 6,497,972 B1 * 12/2002 Iwasaki ............... B60L 11/1881
429/424
2009/0032756 A1 2/2009 Lee et al.
2017/0005357 A1 * 1/2017 Mermelstein ......... H01M 8/186

FOREIGN PATENT DOCUMENTS

| JP | 2006164637 A | 6/2006 |
|---|---|---|
| JP | 5488605 62 | 5/2014 |
| KR | 10-0435669 B1 | 6/2004 |
| KR | 10-1090273 B1 | 12/2011 |

(Continued)

*Primary Examiner* — Cynthia H Kelly
*Assistant Examiner* — Monique M Wills
(74) *Attorney, Agent, or Firm* — Mintz Levin Cohn Ferris Glovsky and Popeo, P.C.; Peter F. Corless

(57) ABSTRACT

An integrated fuel cell control system is provided. The integrated fuel cell control system includes at least one sensor, at least one hydrogen on/off valve, and a fuel control unit (FCU). The FCU is configured to directly operate the at least one sensor and the at least one hydrogen on/off valve in real time and to determine a supply pressure of hydrogen supplied to a fuel cell. Thereby, noise between controllers may be removed and costs may be reduced.

7 Claims, 3 Drawing Sheets

(56) References Cited

FOREIGN PATENT DOCUMENTS

| | | |
|---|---|---|
| KR | 2014-0029883 A | 3/2014 |
| KR | 10-2015-0021774 A | 3/2015 |
| KR | 10-2015-0072238 A | 6/2015 |
| WO | 2010-0135632 A2 | 11/2010 |

* cited by examiner

INTEGRATED FUEL CELL CONTROL SYSTEM AND OPERATING METHOD THEREOF

CROSS REFERENCE TO RELATED APPLICATION

This application claims the benefit of Korean Patent Application No. 10-2016-0016261, filed on Feb. 12, 2016, which is hereby incorporated by reference as if fully set forth herein.

BACKGROUND

Field of the Invention

The present invention relates to vehicle technology, and more particularly, to an integrated fuel cell control system that includes a fuel processing system (FPS) and an operating method thereof.

Discussion of the Related Art

A fuel cell vehicle includes a fuel cell stack that is used as a power source, in which a plurality of fuel cells is stacked, a fuel supply system (e.g., hydrogen supply system) configured to supply a fuel, i.e., hydrogen, to the fuel cell stack, an air supply system configured to supply an oxidant necessary for electrochemical reaction, i.e., oxygen, and a thermal management system configured to adjust the temperature of the fuel cell stack.

In the fuel cell vehicle, the hydrogen supply system is configured to adjust the pressure of high-pressure hydrogen stored in a hydrogen tank using a regulator and then supply the pressure-adjusted hydrogen to the fuel cell stack, and the air supply system is configured to humidify air supplied by an air blower and then supply the humidified air to the fuel cell stack. Further, the fuel cell vehicle uses an electric motor as a driving source to drive the vehicle, and has an inverter configured to convert direct current (DC) voltage of the fuel cell stack or a battery into alternating current (AC) voltage and then drive the electric motor using the AC voltage. The fuel supply system is configured to decompress compressed hydrogen in the hydrogen tank and then supply the decompressed hydrogen to a fuel electrode (an anode) of the stack, and the air supply system is configured to supply external air, suctioned by operating the air blower, to an air electrode (a cathode) of the stack.

When hydrogen is supplied to the anode of the stack and air is supplied to the cathode of the stack, protons are separated from the anode through catalyst reaction. The separated protons are transmitted to the cathode through an electrolyte membrane, the protons separated from the anode, electrons and oxygen cause electrochemical reaction at the cathode and electrical energy may be acquired therethrough. In particular, electrochemical oxidation of hydrogen occurs at the anode, electrochemical reduction of oxygen occurs at the cathode, movement of produced electrons generates electricity and heat, and vapor or water is produced by chemical reaction, i.e., bonding between hydrogen and oxygen.

A discharge device to discharge byproducts, such as vapor, water and heat produced during the electrical energy generation process of the fuel cell stack, and non-reacting hydrogen and oxygen is provided, and gases, such as vapor, hydrogen and oxygen, are discharged to the atmosphere through an exhaust passage. Further, the fuel cell vehicle includes a substantial number of control devices. For example, the fuel cell vehicle includes controllers configured to operate and adjust respective parts, such as hydrogen, oxygen, valves, electric parts and fuel cell cooling, a high-voltage battery and power conversion controllers. Further, the fuel cell vehicle includes a fuel control unit (FCU) configured to comprehensively operate a fuel cell system.

Among controllers, a fuel processing system (FPS) is a controller in charge of on-off control of pressure sensors and valves related with hydrogen supply and may be operated based on a command from a high-level controller, i.e., an FCU. The FCU may be configured to provide a command to the FPS via controller area network (CAN) communication.

FIG. 1 is a block diagram illustrating a conventional fuel cell control system according to the related art. An FCU 90 is connected directly to one hydrogen valve 10 and is configured to operate the hydrogen valve 10; an FPS 80 is connected directly to a hydrogen drain valve 20 and a hydrogen purge valve 30 and is configured to operate the hydrogen drain valve 20 and the hydrogen purge valve 30. The FCU 90 is configured to receive values, sensed by a pressure sensor 40, a water level sensor 50 and a hydrogen sensor 60, from the FPS 80 and transmit cooperative control a command regarding hydrogen supply to the FPS 80.

As described above, in the conventional fuel cell control system, the FCU and the FPS are separated from each other. Direct control by the FPS is advantageous in that an air blower may be directly driven and fault diagnosis may be directly executed. However, since the FCU and the FPS are separated from each other, the conventional fuel cell control system has many drawbacks, such as generation of noise between controllers, increase in costs, difficulty in formation of a package, complex cooperative control, reduction in control efficiency, increase in weight, increase in wire complexity, etc. Therefore, an improved fuel cell control system is required.

SUMMARY

Accordingly, the present invention provides an integrated fuel cell control system and an operating method thereof that substantially obviate one or more problems due to limitations and disadvantages of the related art. An object of the present invention is to provide a fuel cell control system in which an FPS is integrated with an FCU. Another object of the present invention is to provide a fuel cell control system in which an FCU directly operates various sensors, valves and heaters.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an integrated fuel cell control system may include at least one sensor, at least one hydrogen on/off valve, and a fuel control unit (FCU) configured to directly operate the at least one sensor and the at least one hydrogen on/off valve in real time and to determine a supply pressure of hydrogen supplied to a fuel cell.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
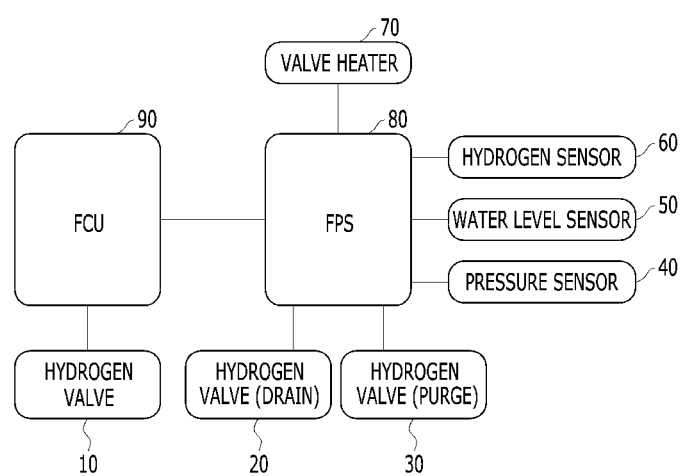
FIG. 1 is a block diagram schematically illustrating a conventional fuel cell control system separated from a fuel processing system (FPS) according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. The suffixes "module" and "unit" used in the description below are given or used together only in consideration of ease in preparation of the specification and do not have distinctive meanings or functions. In the following description of the embodiments, it will be understood that, when each element is referred to as being "on (above) or under (below)" or "in front of or at the rear of" another element, the two elements may directly contact or one or more other elements may be interposed between the elements.

Further, the terms "first", "second", "A", "B", "(a)", "(b)", etc., may be used to describe elements of the present invention. These terms are used only to distinguish the corresponding elements from other elements but do not limit the nature, order or sequence of the corresponding elements. In addition, it will be understood that, when one element is referred to as being "connected to", "combined with" or "coupled with" another element, it may be directly "connected to", "combined with" or "coupled with" the other element or intervening elements may also be present therebetween.

In the following description of the embodiments, it will be interpreted that the terms "including", "consisting of", "having", etc. mean presence of corresponding elements, unless stated otherwise, and do not exclude presence of other elements. All terms including technical or scientific terms have the same meanings as meanings which are generally understood by those skilled in the art, unless stated otherwise. Generally used terms, such as terms defined in dictionaries, should be interpreted as having meanings coinciding with contextual meanings in the related technology and are not interpreted as having ideal or excessively formal meanings, unless defined apparently in the present invention.

Figure 2:
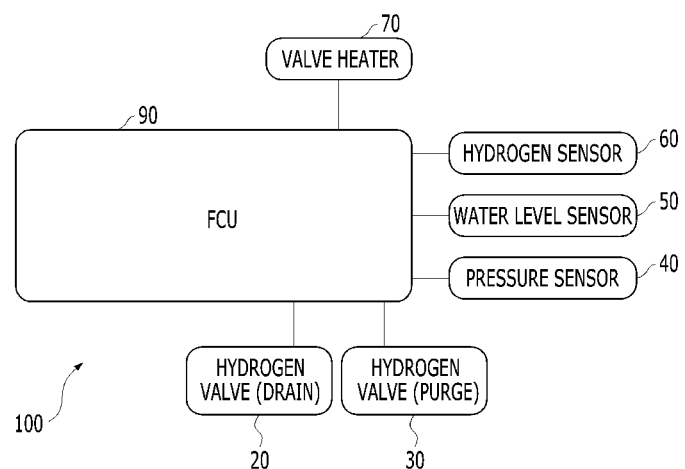
FIG. 2 is a block diagram schematically illustrating an integrated fuel cell control system including an FPS in accordance with one exemplary embodiment of the present invention.

FIG. 2 is a block diagram schematically illustrating an integrated fuel cell control system including an FPS in accordance with one exemplary embodiment of the present invention. As shown in FIG. 2, an integrated fuel cell control system 100 may include a hydrogen drain valve 20, a hydrogen purge valve 30, a pressure sensor 40, a water level sensor 50, a hydrogen sensor 60, a valve heater 70 and an FCU 90. In addition to the above-described elements, the integrated fuel cell control system 100 may include various other elements including as an inverter, a stack, a driving motor, an LDC, main/auxiliary battery modules, a radiator, etc., but a description thereof will be omitted for the sake of brevity.

The hydrogen drain valve 20 may be configured to collect condensed water and discharge the condensed water to a humidifier, and the humidifier may be configured to humidify air using the condensed water and then supply the humidified air to a cathode. The hydrogen drain valve 20 may be used to reset the water level sensor 50. The hydrogen drain valve 20 may be operated directly by the FCU 90. The hydrogen purge valve 30, which is a valve used when impurities are discharged, may be used to reset an integrated value of current. The hydrogen purge valve 30 may have a different function from that of the hydrogen drain valve 20.

The pressure sensor 40 may be configured to sense pressure of a fuel cell due to cooling water/hydrogen. The water level sensor 50 may be configured to sense the level of cooling water in the fuel cell. The hydrogen sensor 60 may be configured to measure hydrogen in the fuel cell. The integrated fuel cell control system 100 may further include various sensors in addition to the above-described sensors 40, 50 and 60, and a detailed description thereof will be omitted. Various elements including the hydrogen drain valve 20, the hydrogen purge valve 30 and the valve heater 70 as well as the above-described sensors 40, 50 and 60 may be operated directly by the FCU 90.

The FCU 90 may be configured to comprehensively operate the integrated fuel cell control system 100 and may include an FPS module. The FCU 90 may include a circuit for transmitting signals (digital & analog) to operate the FPS related sensors 40, 50 and 60, the valve heater 70 and the valves 20 and 30. Specifically, a CPU pin map differing from a conventional CPU pin map when the FCU 90 is operated separately from the FPS, and an improved pattern may be applied to the FCU 90.

Further, in the integrated fuel cell control system 100, the FCU 90 and the FPS may be integrated and, thus, the structure of an inner package may be simplified and an improved wire layout may be provided. The integrated fuel cell control system 100 may omit a hydrogen valve 10 (in FIG. 1) operated by the conventional FCU and may thus have a simplified structure and realize cost reduction effects. Further, the FCU 90 provides SW to implement the function of the conventional FPS. Necessary information may be stored in the FCU 90 or a designated memory of the integrated fuel cell control system 100.

Figure 3:
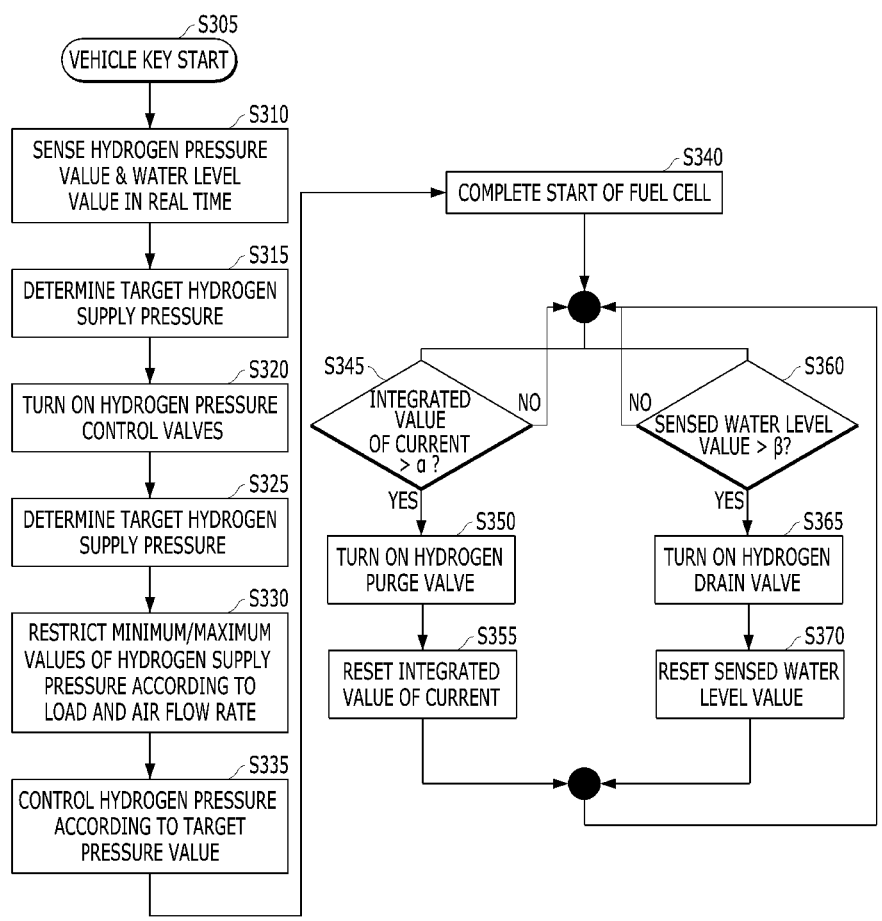
FIG. 3 is a flowchart illustrating an operating method of an integrated fuel cell control system in accordance with one exemplary embodiment of the present invention.

FIG. 3 is a flowchart illustrating an operating method of an integrated fuel cell control system in accordance with one exemplary embodiment of the present invention. Here, reference numerals of FIG. 2 will be referred to. First, key start of a vehicle may be performed (Operation S305). However, the integrated fuel cell control system may be driven even when key start of the vehicle is not performed. Thereafter, the FCU 90 may be configured to sense a hydrogen pressure value and a water level value in real time (Operation S310).

In particular, the FCU 90 may be configured to sense the hydrogen pressure value and the water level value simply and directly, as compared to a conventional method in which an FCU operates an FPS to receive results of sensing a hydrogen pressure value and a water level value. The FCU 90 constitutes a circuit and wiring to directly operate the sensors. Thereafter, the FCU 90 may be configured to determine a target hydrogen supply pressure (Operation S315). The FCU 90 may be configured to determine the target hydrogen supply pressure prior to opening of hydrogen pressure control valves.

Thereafter, the FCU 90 may be configured to turn on the hydrogen pressure control valves (Operation S320). In particular, the FCU 90 may be configured to open the hydrogen drain valve 20 and the hydrogen purge valve 20, and thus, hydrogen pressure may be changed. The circuit, a package and wiring may be constituted to allow the FCU 90 to directly operate the valves 20 and 30. Accordingly, the valve 10 connected to the conventional FCU 90 may be omitted, and thus, cost reduction and a vehicle weight reduction may be realized.

Thereafter, the FCU 90 may again be configured to determine the target hydrogen supply pressure (Operation S325). When the hydrogen pressure is changed by turning on the valves 20 and 30, the FCU 90 may again be configured to determine the target hydrogen supply pressure based on the changed hydrogen pressure. Thereafter, the FCU 90 may be configured to restrict the minimum value and the maximum value of the hydrogen supply pressure based on a load and an air flow rate (Operation S330).

Further, the FCU 90 may be configured to set the minimum and maximum values of the hydrogen supply pressure and restrict the minimum and maximum values when the hydrogen supply pressure is less than the minimum value or greater than the maximum value. Thereafter, the FCU 90 may be configured to adjust hydrogen pressure based on the target pressure value (Operation S335). Both Operation S330 and Operation D340 may be performed by the FCU 90 and thereby improved convenience in control and rapidity in operation may be provided, as compared to the conventional method in which Operation S330 is performed by the FCU 90 and Operation S340 is performed by the FPS.

When start of the fuel cell is completed (Operation S340), the hydrogen purge valve 30 and the hydrogen drain valve 20 may be operated in parallel. The FCU 90 may be configured to monitor an integrated value of current (Operation S345) and monitor a sensed water level value (Operation S360). As a result of monitoring the integrated value of current of the fuel cell, when the integrated value of current exceeds a predetermined value ($\alpha$), the FCU 90 may be configured to turn on the hydrogen purge valve 30 (Operation S350).

Thus, the method of the present invention differs from the conventional method in which the FCU 90 transmits a hydrogen purge valve-On command to the FPS and the FPS turns on the hydrogen purge valve. The predetermined value ($\alpha$) may be set prior to key start of the vehicle (Operation S305), but the disclosure is not limited thereto. In particular, the FCU 90 may be configured to reset the integrated value of current (Operation S355) and then again monitor the integrated value of current.

As a result of monitoring the sensed water level value, when the sensed water level value exceeds a predetermined value ($\beta$), the FCU 90 may be configured to turn on the hydrogen drain valve 20 (Operation S365). Thus, the method of the present invention differs from the conventional method in which the FCU 90 transmits a hydrogen drain valve-On command to the FPS and the FPS turns on the hydrogen drain valve. The predetermined value ($\beta$) may be set in advance. In particular, the FCU 90 may be configured to reset the sensed water level value and then again monitor the sensed water level value.

The method in accordance with the above-described exemplary embodiments may be implemented as a computer executable program and stored in a computer readable recording medium. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers in the art to which the embodiments pertain.

As apparent from the above description, an integrated fuel cell control system and an operating method thereof in accordance with various exemplary embodiments of the present invention have effects, as follows. The integrated fuel cell control system in accordance with one exemplary embodiment of the present invention may remove noise between controllers, reduce costs and improve simplicity in package configuration.

Further, the integrated fuel cell control system in accordance with one exemplary embodiment of the present invention may simplify complicated cooperative control between controllers and improve efficiency in control. The integrated fuel cell control system in accordance with one exemplary embodiment of the present invention may also improve efficiency in wire usage and simplicity in circuit configuration.

Additionally, the integrated fuel cell control system in accordance with one exemplary embodiment of the present invention may omit an FPS and a specific on/off value and thus enhance the layout of a vehicle engine compartment. Moreover, the integrated fuel cell control system in accordance with one exemplary embodiment of the present invention may reduce a CAN bus load used in cooperative control between the FPS and an FCU.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An integrated fuel cell control system, comprising:
   at least one sensor;
   at least one hydrogen on/off valve including a hydrogen purge valve and a hydrogen drain valve; and
   a fuel control unit (FCU) configured to directly operate the at least one sensor and the at least one hydrogen on/off valve in real time and to determine a supply pressure of hydrogen supplied to a fuel cell,
   wherein the FCU is configured to first determine a target supply pressure of hydrogen supplied to the fuel cell based on a hydrogen pressure value and a cooling water level value of the fuel cell sensed from the at least one sensor, open the at least one hydrogen on/off valve, and then secondarily determine the target supply pressure of hydrogen supplied to the fuel cell based on the changed hydrogen pressure according to open the at least one hydrogen on/off valve,
   wherein after the start of the fuel cell is completed, the FCU is configured to control the hydrogen purge valve and the hydrogen drain valve in parallel,
   wherein the hydrogen purge valve is opened based on a comparison value between an integrated value of current of the fuel cell and a first predetermined value, and
   wherein the hydrogen drain valve is opened based on the comparison value between a sensed cooling water level value of the fuel cell and a second predetermined value.

2. The integrated fuel cell control system according to claim 1, wherein the at least one sensor includes at least one selected from the group consisting of: a hydrogen sensor configured to sense hydrogen and a hydrogen amount, a water level sensor configured to sense a level of cooling water of the fuel cell, and a pressure sensor configured to sense a pressure of the fuel cell.

3. The integrated fuel cell control system according to claim 1, wherein the FCU is configured to set the minimum value and the maximum value of a hydrogen supply pressure based on a load and an air flow rate, and adjust a hydrogen pressure based on the secondarily determined target supply pressure of hydrogen.

4. The integrated fuel cell control system according to claim 1, wherein the FCU is configured to monitor an integrated value of current of the fuel cell, when start of the fuel cell is completed.

5. The integrated fuel cell control system according to claim 1, wherein the FCU is configured to monitor a sensed water level value, when start of the fuel cell is completed.

6. The integrated fuel cell control system according to claim 4, wherein the FCU is configured to turn on the hydrogen purge valve and reset the integrated value of current, when the integrated value of current exceeds the first predetermined value.

7. The integrated fuel cell control system according to claim 5, wherein the FCU is configured to turn on the hydrogen drain valve and reset the sensed water level value, when the sensed water level value exceeds the second predetermined value.

* * * * *